(12) United States Patent
Oka (10) Patent No.: US 8,031,365 B2
(45) Date of Patent: Oct. 4, 2011

(54) IMAGE PROCESSOR AND IMAGE PROCESSING METHOD FOR REDUCING CONSUMPTION AMOUNT OF RECORDING MATERIAL

(75) Inventor: Hiroyuki Oka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 12/032,300

(22) Filed: Feb. 15, 2008

(65) Prior Publication Data
US 2008/0259367 A1 Oct. 23, 2008

(30) Foreign Application Priority Data

Apr. 18, 2007 (JP) .................................. 2007-109693

(51) Int. Cl.
*G06F 15/00* (2006.01)
(52) U.S. Cl. ......... 358/1.9; 358/448; 358/443; 358/518; 358/530; 399/39; 399/38
(58) Field of Classification Search .................. 358/1.9, 358/448, 443, 518, 530; 399/39, 38
See application file for complete search history.

(56) References Cited

U.S. PATENT DOCUMENTS

| | | | | | |
|---|---|---|---|---|---|
| 4,482,917 | A | * | 11/1984 | Gaulke et al. ................. | 358/518 |
| 5,077,604 | A | * | 12/1991 | Kivolowitz et al. ........... | 358/520 |
| 5,172,223 | A | * | 12/1992 | Suzuki et al. ................. | 358/529 |
| 5,386,305 | A | * | 1/1995 | Usami .......................... | 358/518 |
| 5,751,433 | A | * | 5/1998 | Narendranath et al. ....... | 358/1.9 |
| 5,764,388 | A | * | 6/1998 | Ueda et al. .................... | 358/529 |
| 6,084,689 | A | * | 7/2000 | Mo ............................... | 358/1.9 |
| 6,813,043 | B1 | * | 11/2004 | Mizuyama et al. ........... | 358/3.03 |
| 7,355,753 | B2 | * | 4/2008 | Yao ............................... | 358/1.9 |
| 2006/0056683 | A1 | | 3/2006 | Komatsu ....................... | 382/162 |

FOREIGN PATENT DOCUMENTS

| | | |
|---|---|---|
| JP | 8-275010 | 10/1996 |
| JP | 11-112789 | 4/1999 |
| JP | 2005-35012 | 2/2005 |
| JP | 2006-068982 | 3/2006 |

OTHER PUBLICATIONS

Office Action dated May 1, 2009 in JP 2007-109693.

* cited by examiner

*Primary Examiner* — Benny Tieu
*Assistant Examiner* — Paul F Payer
(74) *Attorney, Agent, or Firm* — Fitzpatrick, Cella, Harper & Scinto (57) ABSTRACT

The present invention provides an image processor for outputting image data to an image forming device forming an image with use of a recording material having a plurality of color components. The processor comprises a component determining a region having higher brightness than predetermined brightness and a region having lower brightness than the predetermined brightness in the image data based on the image data and a component adjusting saturation so as to reduce density values of color components other than a color component having a maximum density value among the plurality of color components of the recording material to increase saturation in a region having brightness determined to be high and reduce density values of color components other than a color component having a minimum density value among the plurality of color components of the recording material to decrease saturation in a region having brightness determined to be low.

10 Claims, 7 Drawing Sheets

FIG.7

IMAGE PROCESSOR AND IMAGE PROCESSING METHOD FOR REDUCING CONSUMPTION AMOUNT OF RECORDING MATERIAL

BACKGROUND OF THE INVENTION

1. Field of the Invention

The present invention relates to a technique for processing an image to be printed on a recording medium such as paper with use of a recording material such as ink or toner.

2. Description of the Related Art

In recent years, companies have been making proactive efforts in environmental issues and cost reduction. In such a context, a printing industry has been required to reduce a use amount of a recording material such as ink or toner. In particular, because digital still cameras and color printers have been rapidly spread, color printing has become more convenient and closer to consumers, so that it is expected to further expand the use of such equipment. Accordingly, in the printing industry, reducing the use amount of the recording material is one of the important problems to be promptly addressed to take measures against the environmental issues and accomplish the cost reduction.

Approaches for reducing the use amount of the recording material include, for example, the following five approaches: (1) To change a printing method from four-color printing to two-color printing to thereby reduce the number of types of recording materials. (2) To reduce a limit value of a recording material density per unit area of printing paper. (3) To reduce a density of a recording material to be used. (4) To thin pixels necessary to form an image. (5) To replace mixed color of cyan, magenta, and yellow by black.

In the color printing, colors are expressed by combinations of three color inks of cyan, magenta, and yellow, or the like. All colors can be expressed by the three colors of cyan, magenta, and yellow in theory; however, in practice, deep and bright black color cannot be expressed. For this reason, in full-color printing, the deep and bright black color is expressed by adding black ink. In the above approach (1), such four color inks of cyan, magenta, yellow, and black are reduced in number to two color inks to thereby reduce the use amount of the recording material. However, this approach cannot express many of colors perceivable by human beings, so that image quality of a printed material becomes very poor.

In the approaches (2) to (4), the density of the recording material is simply reduced to thereby suppress the use amount of the recording material. For example, pieces of pixel data are thinned to thereby reduce the number of pixels necessary to form an image, resulting in the suppression of the use amount of ink (see Japanese Patent Laid-Open No. H11-112789. However, in these approaches, the recording material density per unit area of printing paper is only equally reduced, so that clearness and contrast of a printed material are reduced.

The approach (5) is referred to as UCR (Under Color Removal). The UCR utilizes a characteristic feature that even if an under color among cyan, magenta, and yellow, which is the color having the lowest density value among the three colors, is replaced by a black color having the same density value as the lowest density value, color tone (hue) is not much different. The use of the UCR enables the consumption amount of the recording material to be reduced without deteriorating the image quality too much. On the other hand, the density of the recording material applicable onto the printing paper has a limit (limit value). Accordingly, in a printing area in which dark color should be expressed, the UCR is typically used to reduce the consumption amount of the recording material.

The use of the UCR enables the consumption amount of the recording material to be reduced without deteriorating the image quality too much; however, in recent years, an approach for reducing the consumption amount of the recording material with use of a color space compression technology along with the UCR is also considered (see Japanese Patent Laid-Open No. 2006-68982). The color space compression is a technology for compressing color into a narrow color reproduction range from a wide color reproduction range, and used when an image displayed on a device having the wide color reproduction range is output with use of a printer having the narrow color reproduction range. For example, when an image displayed on a liquid crystal display is output with the printer, the color space compression is applied. In Japanese Patent Laid-Open No. 2006-68982, by using the color space compression to convert high saturation color into low saturation and high brightness color, a black replacement ratio in the UCR is increased. This enables the consumption amount of the recording material to be reduced while suppressing the change in color tone of the image.

However, the reduction in consumption amount of the recording material only by the UCR has a limit. Also, the approach disclosed in Japanese Patent Laid-Open No. 2006-68982 described above has a problem that saturation and brightness of the image are respectively decreased and increased at the time of the color conversion, and therefore clearness of the image is spoiled and also contrast is reduced, resulting in unclearness of the printed image.

SUMMARY OF THE INVENTION

An object of the present invention is to provide an image processor and the like capable of reducing the consumption amount of the recording material while suppressing the unclearness of the printed image.

The present invention provides an image processor for outputting image data to an image forming device forming an image on a recording medium with use of a recording material having a plurality of color components. The image processor comprises a determination component for determining a region having higher brightness than predetermined brightness and a region having lower brightness than the predetermined brightness in the image data on the basis of the image data and a saturation adjustment component for adjusting saturation so as to reduce density values of color components other than a color component having a maximum density value among the plurality of color components of the recording material to increase saturation in a region having brightness determined to be high by the determination component, and reduce density values of color components other than a color component having a minimum density value among the plurality of color components of the recording material to decrease saturation in a region having brightness determined to be low by the determination component.

The present invention provides an image processing method for outputting image data to an image forming device forming an image on a recording medium with use of a recording material having a plurality of color components. The image processing method comprises determining a region having higher brightness than predetermined brightness and a region higher brightness than the predetermined brightness in the image data on the basis of the image data and reducing density values of color components other than a color component having a maximum density value among the plurality of color components of the recording material to increase saturation in a region having brightness determined to be high, and reducing density values of color components other than a color component having a minimum density value among the plurality of color components of the recording material to decrease saturation in a region having brightness determined to be low.

The present invention provides a computer-readable recording medium having computer-executable instructions for performing outputting image data to an image forming device forming an image on a recording medium with use of a recording material having a plurality of color components. The computer-executable instructions comprise steps of determining a region having higher brightness than predetermined brightness and a region having lower brightness than the predetermined brightness in the image data on the basis of the image data and adjusting saturation so as to reduce density values of color components other than a color component having a maximum density value among the plurality of color components of the recording material to increase saturation in a region having brightness determined to be high by the determining step, and reduce density values of color components other than a color component having a minimum density value among the plurality of color components of the recording material to decrease saturation in a region having brightness determined to be low by the determining step.

The present invention can reduce density values of color components other than a color component having the maximum density value among CMY without changing the maximum density value in a region of a printed image where a density value of an under color among CMYK of the recording material is smaller than a predetermined threshold value. This enables saturation to be increased to thereby enhance color tone in the high brightness region of the printed image.

Also, the present invention reduces density values of color components other than a color component having the minimum density value among CMY without changing the minimum density value in a region of the printed image where the density value of the under color of the recording material is larger than the predetermined threshold. This enables the saturation to be decreased to thereby bring color close to achromatic color in the dark region of the printed image.

Further, the present invention can maintain contrast and suppress deterioration in image quality because it does not reduce the consumption amount of the recording material in the case of the achromatic color (color of which cyan, magenta, and yellow components respectively have the same density value).

Still further, when the consumption amount of the recording material cannot be sufficiently reduced only with the saturation adjustment processing, the present invention can equally increase a reduction rate of the consumption amount of the recording material to a target reduction rate set by a user. Equally reducing the consumption amount of the recording material results in deterioration of saturation and contrast. However, in the present invention, the saturation adjustment component reduces the consumption amount of the recording material to some extent while preliminarily preventing the deterioration of the saturation and contrast of an image. Accordingly, the present invention can suppress the deterioration of the saturation and contrast of the image, as compared with the case of accomplishment of the same target value with the conventional approach in which the consumption amount of the recording material is only equally reduced.

Further features of the present invention will become apparent from the following description of exemplary embodiments (with reference to the attached drawings).

DESCRIPTION OF THE EMBODIMENTS

Preferred embodiments of the present invention will hereinafter be described with reference to the drawings.

Firstly, a first embodiment of the present invention is described with reference to the drawings.

Figure 1:
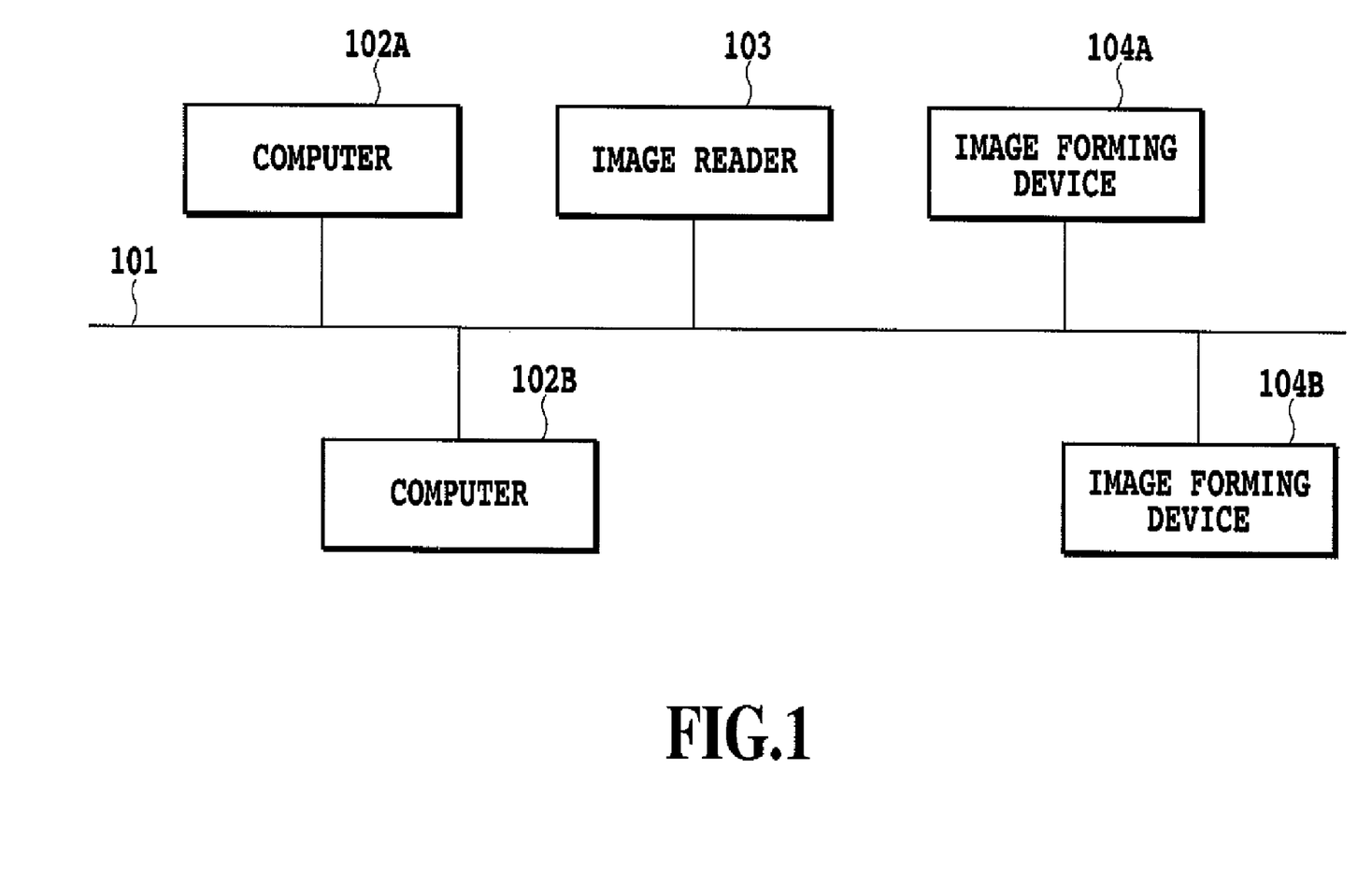
FIG. 1 is a block diagram illustrating an example of an image forming system according to a first embodiment.

FIG. 1 is a block diagram illustrating an example of an image forming system 100 including an image forming device. The image forming device is a device for forming an image to be printed on a recording medium such as paper with use of a recording material such as ink or toner.

The image forming system 100 comprises computers 102A and 102B, image reader 103, and image forming devices 104A and 104B. These devices respectively transmit/receive image data and the like to/from one another via a data transfer path 101. In FIG. 1, a configuration of the data transfer path 101 is a local area network (LAN); however, it may be another configuration. For example, the data transfer path 101 may have a configuration using wireless communication, a configuration in which the computer 102 is directly connected to another device, or another configuration.

The computer 102 stores an application software generating print data, and a printer driver outputting a printing command and image data to the image forming device 104.

The image reader 103 reads image data, and outputs a printing command or the image data to the image forming device 104. Examples of the image reader 103 include, but are not limited to, a scanner or digital camera.

The image forming device 104 receives the printing command and the image data transmitted by the computer 102 or the image reader 103, then based on the received printing command and image data, forms a color image for printing, and subsequently prints the color image with use of the recording material such as ink or toner. Examples of the image forming device 104 include, but are not limited to, a printer, FAX, copying machine, or offset printer, which is capable of color printing.

The computer 102 or the image reader 103 applies predetermined image processing to the image data, and then outputs the image-processed image data to the image forming device 104. If the image forming device 104 incorporates an image processing function, the image forming device 104 may perform the image processing. Processing for reducing the consumption amount of the recording material, according to the present invention, is performed in the course of this image processing.

Figure 2:
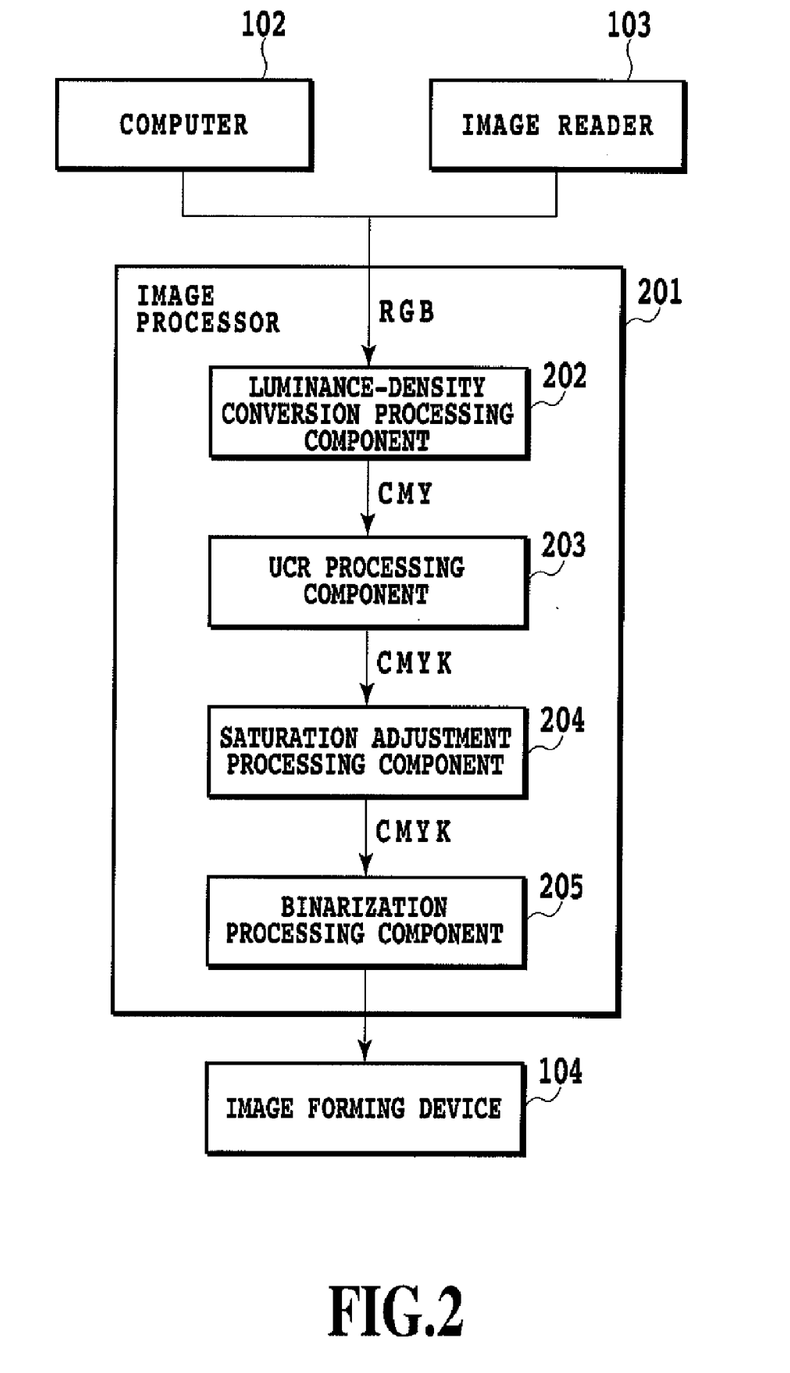
FIG. 2 is a block diagram illustrating an example of an image forming system according to a first embodiment.

An image forming processing flow in the image forming system 100 is then described with use of FIG. 2.

The image processing function is incorporated in the computer 102, the image reader 103, or the image forming device 104. However, in this embodiment, for descriptive convenience, an image processor 201 independently performing the image processing is virtually provided as illustrated in FIG. 2 to thereby describe the image processing function.

The image processing function in the first embodiment is described below in detail with reference to the image processor 201 illustrated in FIG. 2.

The image processor 201 comprises a luminance-density conversion processing component 202, UCR processing component 203, saturation adjustment processing component 204, and binarization processing component 205.

The computer 102 or the image reader 103 outputs the printing command and the image data to the image processor 201. The image data is output in the form of RGB luminance signals.

Upon receipt of the RGB signals input from the computer 102 or the image reader 103, the luminance-density conversion processing component 202 converts RGB luminance values into density values of CMY, which are a plurality of color components, with use of logarithmic conversion. The following description is given based on the assumption that the CMY density values respectively take values ranging from 0 to 100. However, a program often implements the possible CMY density values as values ranging from 0 to 255.

The UCR processing component 203 performs UCR that replaces a density value of an under color, which is the minimum density value among CMY, by a density value of black, and then outputs the UCR-processed CMYK density values to the saturation adjustment processing component 204.

The saturation adjustment processing component 204 reduces the CMYK densities according to a procedure to be described later to thereby reduce the consumption amount of the recording material. Also, the saturation adjustment component 204 adjusts saturation on a pixel-by-pixel basis. Further, after having adjusted the CMYK density values, the saturation adjustment component 204 outputs the CMYK to the binarization processing component 205.

The binarization processing component 205 converts the CMYK into a binary or a multi-value image that the image forming device 104 can handle, and then outputs it to the image forming device 104.

<Processing By the Saturation Adjustment Processing Component 204>

Figure 5:
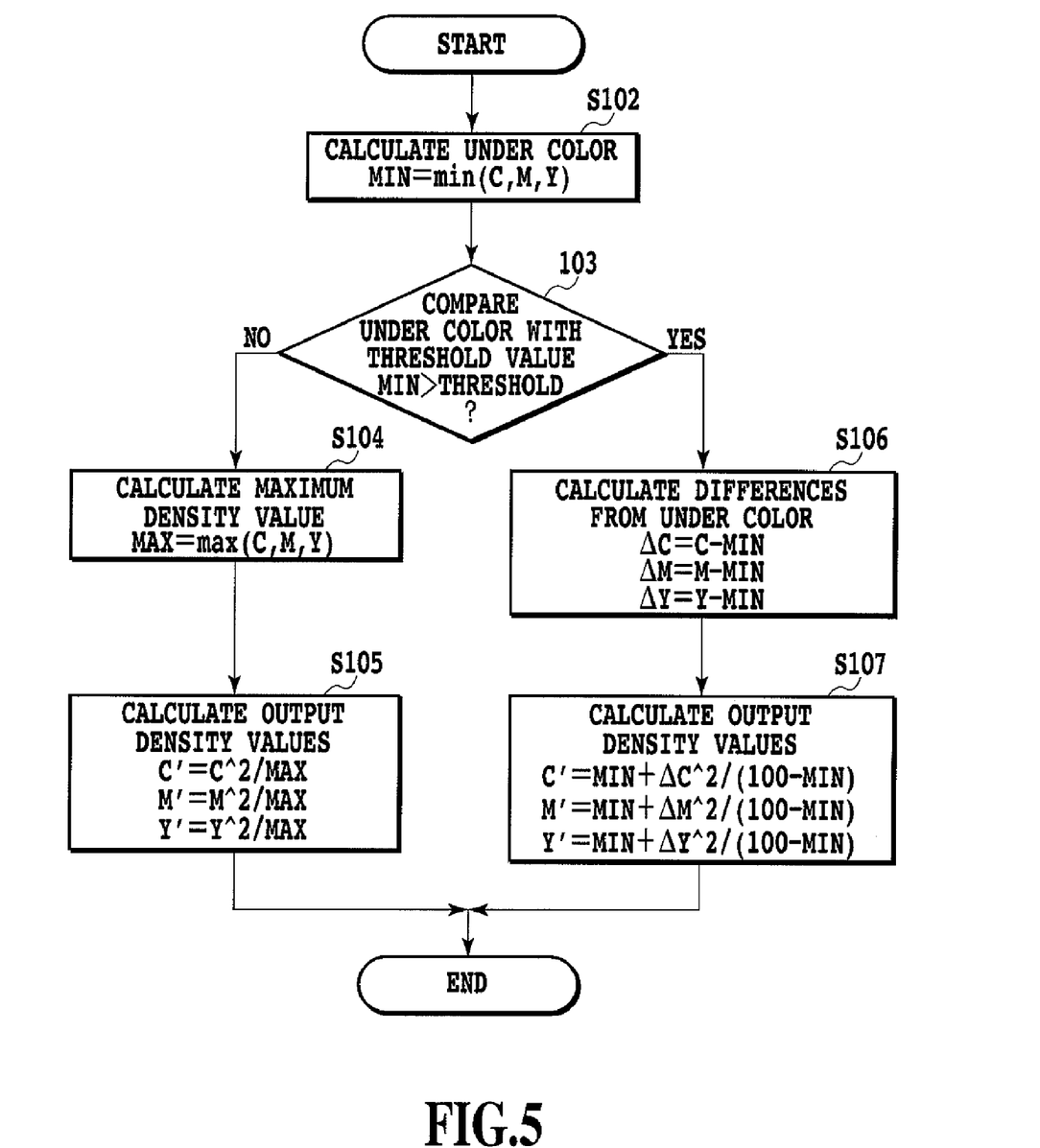
FIG. 5 is a flowchart illustrating processing details of a saturation adjustment processing component.

FIG. 5 is a flowchart illustrating the processing performed by the saturation adjustment processing component 204.

Upon receipt of the CMYK density values from the UCR processing component 203, the saturation adjustment processing component 204 calculates the under color (which has the minimum density value among CMY) of each pixel (Step S102). Because all of the under colors among CMY are not necessarily replaced by K in the UCR processing component 203, some of the under colors may be present even after the UCR processing. The under color has the minimum density value among CMY, so that it can be calculated from Expression (1). In Expression (1), "min ( )" is a function for obtaining the minimum density value among CMY. Also, "MIN" is a variable to which the minimum density value among CMY is assigned. That is, "MIN" represents the density value of the under color among CMY.

$$MIN = \min(C, M, Y) \qquad \text{Expression (1)}$$

Figure 6A:
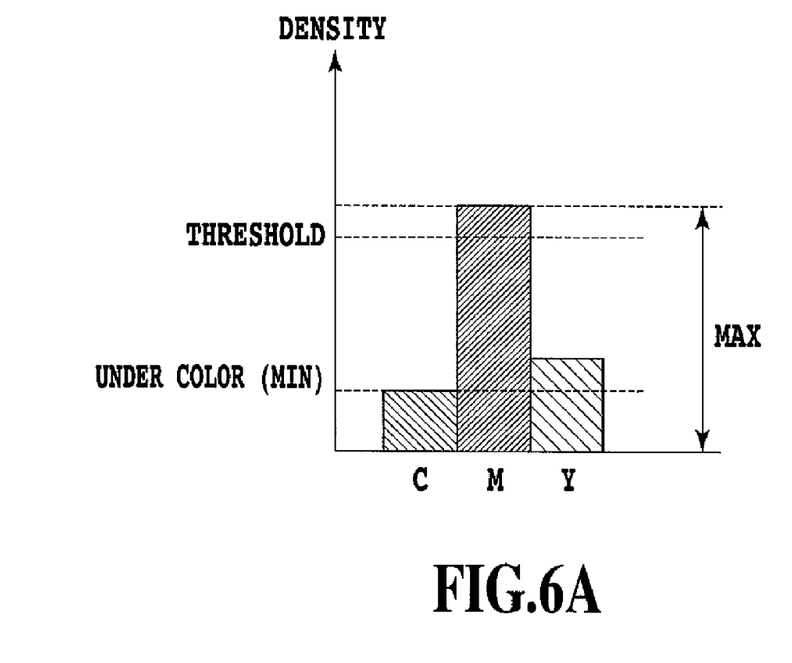
FIG. 6A is a diagram illustrating densities of CMY to which the saturation adjustment processing is applied.
Figure 6B:
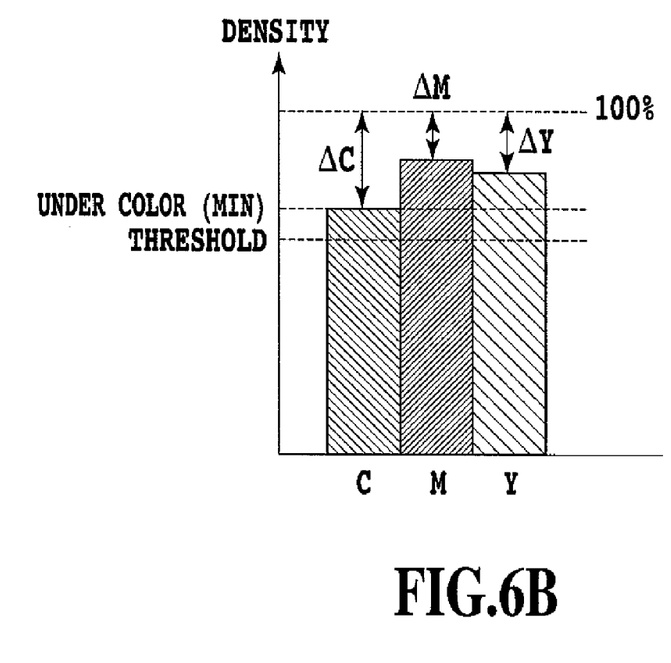
FIG. 6B is a diagram illustrating densities of CMY to which the saturation adjustment processing is applied.

In Step S103, the saturation adjustment processing component 204 compares the density value of the under color among CMY with a threshold value. Then, the saturation adjustment processing component 204 applies processing of Step S106 to a region where the density value of the under color among CMY is larger than the threshold value, or processing of Step S104 to the other region. The threshold value may be a value specified by a user via a user interface to be described later, or a fixed value preset in the image forming device 201. The determination made in Step S103 is one whether brightness of color of CMY is high or low. For example, if CMY respectively have density values as represented by a graph illustrated in FIG. 6A, the density value of the under color is smaller than the threshold value, and therefore it is determined that CMY has high brightness. On the other hand, if CMY respectively have density values as represented by a graph illustrated in FIG. 6B, the density value of the under color is larger than the threshold value, and therefore it is determined that CMY is dark color.

Alternatively, after comparing brightness of image with a predetermined brightness in S103, the process of S106 may be executed for a region having higher brightness than the predetermined brightness in the image data or the process of S104 may be executed for a region having lower brightness than the predetermined brightness in the image data. The predetermined brightness may be specified by a user via a user-interface described below. Alternatively, the predetermined brightness may be a fixed value preliminarily set for the image processor 201.

If it is determined in Step S103 that CMY has high brightness, the processing proceeds to Steps S104 and S105, where the density values other than the maximum density value are reduced to thereby increase the saturation. On the other hand, if it is determined in Step S103 that CMY has low brightness (dark color), the processing proceeds to Steps S106 and S107, where the density values other than the minimum density value are reduced to thereby decrease the saturation.

Specifically, the saturation adjustment processing component 204 performs the following processing.

In Step S104, the saturation adjustment processing component 204 obtains the maximum density value (MAX) among the CMY density values with use of Expression (2). In Expression (2), "max ( )" is a function for obtaining the maximum density value among CMY. "MAX" is a variable to which the maximum density value among CMY is assigned. That is, MAX represents the maximum density value among CMY.

$$MAX = \max(C, M, Y) \qquad \text{Expression (2)}$$

In Step S105, in order to increase the saturation, the saturation adjustment processing component 204 applies processing to each of the CMY density values, by which the density value having a larger difference from the maximum density value (MAX) among CMY is more significantly reduced. That is, the maximum density value (MAX) among the CMY density values is not changed, but the other density values are reduced. This processing is performed with use of Expression (3).

$$C' = (C/MAX) \times C = C^2/MAX$$

$$M' = (M/MAX) \times M = M^2/MAX$$

$$Y' = (Y/MAX) \times Y = Y^2/MAX \qquad \text{Expression (3)}$$

In Expression (3), the maximum density value among the CMY density values is made equal to MAX, so that the maximum density value is not changed, but the density values other than the maximum density value are reduced because they are smaller than MAX. This reduces the density value of the under color, and therefore the saturation is increased. The density-adjusted CMY density values (C', M', Y'), which are output values of Expression (3), maintain continuity with respect to continuous input values, so that even after the saturation adjustment processing, a gradation of the image is held.

In addition, when it is determined that the brightness is high, both the maximum density value and the density values other than the maximum density value may be reduced to thereby increase the saturation. In that case, the saturation can increase by making the reduction amount of density for the maximum density value smaller than the reduction amount of density for the density values other than the maximum density.

On the other hand, in Steps S106 and S107, the saturation adjustment processing component 204 performs processing for bringing the CMY density values close to the density value of the under color. That is, in order to decrease the saturation, the saturation adjustment processing component 204 reduces the density values other than the density value of the under color, which has the minimum density value (MIN) among the CMY density values, without changing the density value of the under color. The minimum density value among the CMY density values has been already calculated with use of Expression (2), before these steps.

In Step S106, the saturation adjustment processing component 204 first calculates differences between the density value of the under color (MIN) and the respective CMY density values with use of Expression (4).

$$\Delta C = C - \text{MIN}$$

$$\Delta M = M - \text{MIN}$$

$$\Delta Y = Y - \text{MIN}$$

Subsequently, in Step S107, the saturation adjustment processing component 204 reduces the differences obtained by Expression (4), with use of Expression (5).

$$C' = \text{MIN} + \Delta C/(100 - \text{MIN}) \times \Delta C = \text{MIN} + \Delta C^2/(100 - \text{MIN})$$

$$M' = \text{MIN} + \Delta M/(100 - \text{MIN}) \times \Delta M = \text{MIN} + \Delta M^2/(100 - \text{MIN})$$

$$Y' = \text{MIN} + \Delta Y/(100 - \text{MIN}) \times \Delta Y = \text{MIN} + \Delta Y^2/(100 - \text{MIN}) \quad \text{Expression (5)}$$

In Expression (5), the minimum density value among the CMY density values is equal to MIN, so that the minimum density value is not changed, but the density values other than the minimum density value is reduced because they are larger than MIN. This reduces a difference between the density value of the under color and the maximum density value, and therefore the saturation is decreased. The density-adjusted CMY density values (C', M', Y'), which are output values of Expression (5), maintain continuity with respect to continuous input values, so that even after the saturation adjustment processing, it becomes possible to hold the gradation of the image.

In addition, when it is determined that the brightness is low, both the minimum density value and the density values other than the minimum density value may be reduced to thereby decrease the saturation. In that case, the saturation can decrease by making the reduction amount of density for the minimum density value smaller than the reduction amount of density for the density values other than the minimum density.

The first embodiment described above enables the consumption amount of the recording material to be reduced while suppressing deterioration in image quality of a printed image.

Next, a second embodiment of the present invention is described with reference to the drawings.

In the first embodiment, a reduction amount out of the consumption amount of the recording material is changed depending on color distribution of the printed image. Compared with this, the second embodiment is adapted such that the reduction amount out of the consumption amount of the recording material is fixed, and the user can adjust the threshold value for the saturation adjustment processing.

Figure 3:
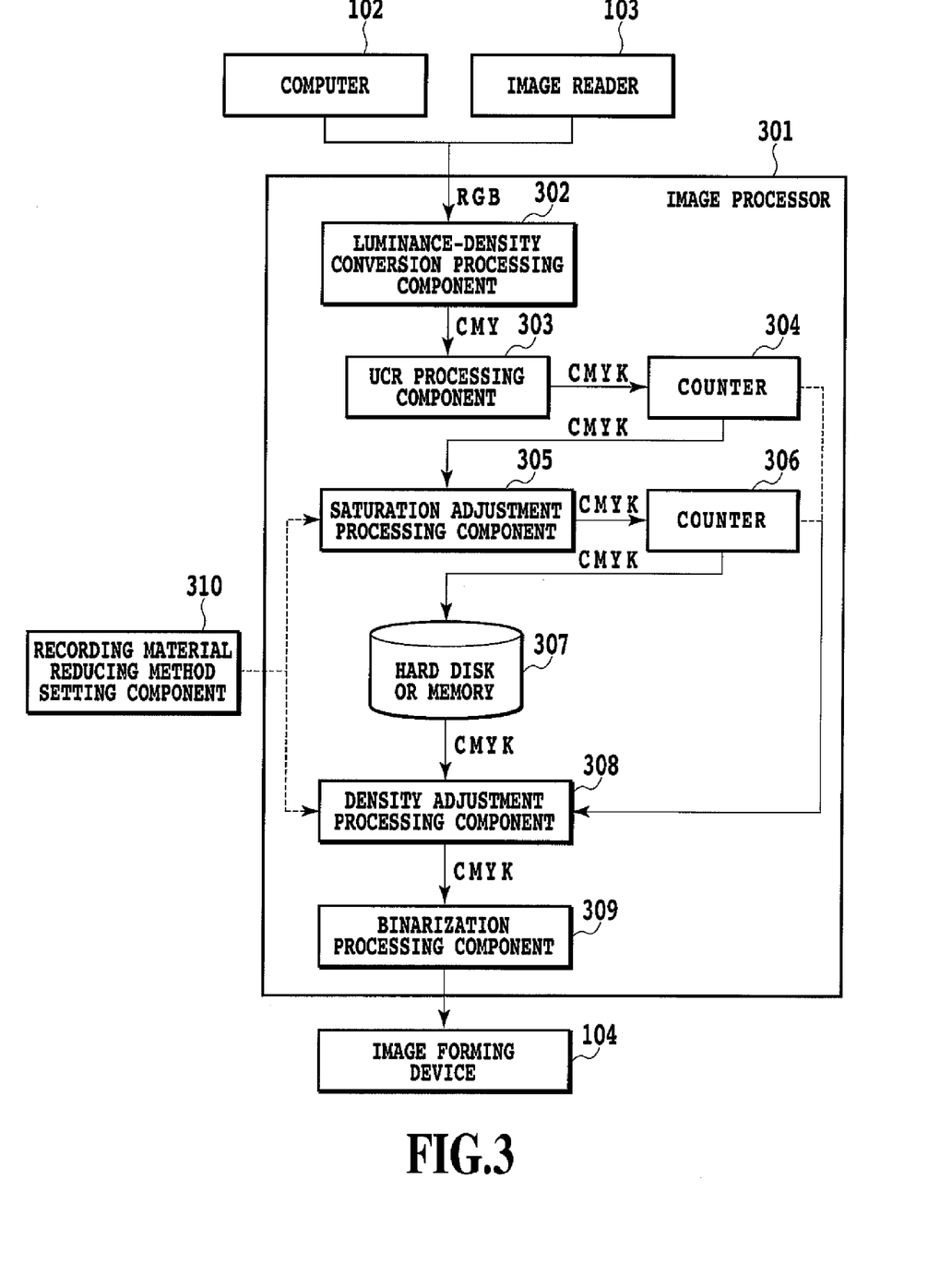
FIG. 3 is a block diagram illustrating an example of an image forming system according to a second embodiment.

FIG. 3 is a block diagram illustrating one example of an image processor in the second embodiment.

Referring to FIG. 3, an image processor 301 comprises a luminance-density conversion processing component 302, UCR processing component 303, counter 304, saturation adjustment processing component 305, counter 306, storage 307 such as a hard disk or memory, density adjustment processing component 308, and binarization processing component 309.

The computer 102 or the image reader 103 outputs a printing command and image data to the image processor 301. The image data is output in the form of RGB luminance signals.

Upon receipt of the RGB signals input from the computer 102 or the image reader 103, the luminance-density conversion processing component 302 converts RGB luminance values into CMY density values with use of logarithmic conversion.

The UCR processing component 303 performs UCR that replaces a density value of an under color, which is the minimum density value among CMY, by a density value of black, and then outputs the UCR-processed CMYK density values to the counter 304.

The counter 304 counts the CMYK density values. The counter 304 counts the CMYK density values of each of all pixels or pixels thinned by sampling of image data, and outputs them to the saturation adjustment processing component 305.

The saturation adjustment processing component 305 performs the same saturation adjustment processing as in the first embodiment with respect to the CMYK density values.

The counter 306 counts density values of CMYK of which saturation has been adjusted by the saturation adjustment processing component 305. The counter 306 counts the CMYK density values of each of all pixels or pixels thinned by sampling of the image data, and outputs them to the storage 307.

The storage 307 spools the image data.

Based on values indicated by the counter 304 and those by the counter 306, the density adjustment processing component 308 obtains how much the saturation adjustment processing component 305 has reduced a density value of the recording material, i.e., a reduction rate of the consumption amount of the recording material, which represents how much the consumption amount of the recording material has been reduced.

The density adjustment processing component 308 calculates a difference between the reduction rate of the consumption amount of the recording material having been obtained on the basis of the values of the counter 304 and those of the counter 306 and a target reduction rate of the recording material having been specified by the user, and equally reduces the CMYK density values at the difference in rate. For example, if the reduction amount required by the user corresponds to 50% whereas the consumption amount of the recording material having been reduced by the saturation adjustment processing component 305 corresponds to 15%, the density adjustment processing component 308 further reduces the CMYK density values at the rate of 35%, which is the difference therebetween. This reduction can be accomplished by, for example, equally multiplying the CMYK density values by a gain of 0.65. Alternatively, the CMYK densities may be equally reduced with use of a simple function. This processing for equally reducing the CMYK densities may be any processing capable of calculating the CMYK density values to be reduced. Subsequently, the density adjustment processing component 308 outputs the density-adjusted CMYK to the binarization processing component 309.

The binarization processing component 309 converts the CMYK into a binary or a multi-value image that the image forming device 104 can handle, and then outputs it to the image forming device 104.

Functions of the recording material reducing method setting component 310 setting the threshold value referred to by the saturation adjustment processing component 305 and the target reduction rate of the recording material referred to by the density adjustment processing component 308 are then described.

The recording material reducing method setting component 310 is loaded in the computer 102 or the image forming device 104. In this embodiment, an example in which the recording material reducing method setting component 310 is loaded in the computer 102 is given.

Figure 7:
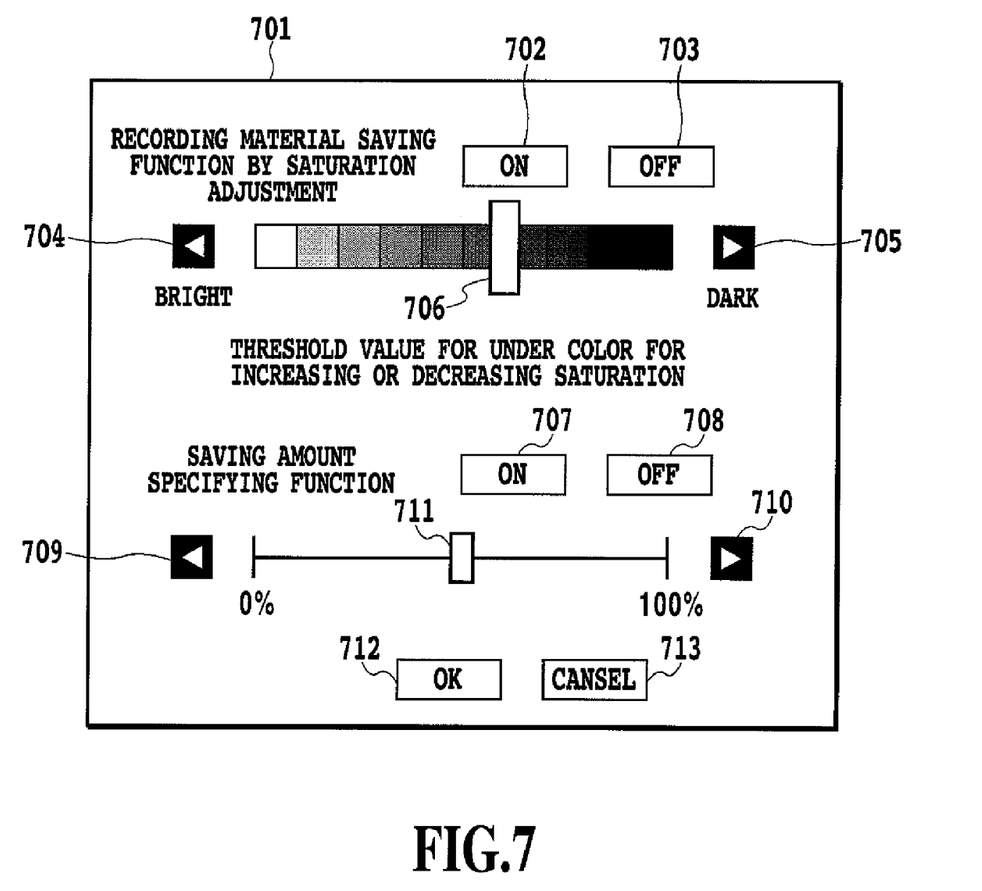
FIG. 7 is a diagram illustrating an example of a screen provided by a recording material reducing method setting component.

FIG. 7 illustrates a user interface screen 701 provided by the recording material reducing method setting component 310.

Functions of various buttons provided to the user by the screen 701 are described below with reference to FIG. 7.

Buttons 702 and 703 are ones for setting to enable and disable a saturation adjustment function, respectively. When the button 702 is pressed down, the saturation adjustment function is enabled, whereas when the button 703 is pressed down, the saturation adjustment function is disabled.

While the saturation adjustment function is disabled, the CMYK density values output by the UCR processing component 303 are directly output to the density adjustment processing component 308 without going through the counters 304 and 306, and storage device 307, and then in the density adjustment processing component 308, the processing for reducing the consumption amount of the recording material is performed.

On the other hand, while the saturation adjustment function is enabled, the threshold value for the density of the under color can be set by moving a slider bar 706 right and left. Moving the slider bar 706 left enables the threshold value to be set lower, whereas moving it right enables the threshold value to be set higher. Accordingly, when the slider bar 706 is moved to the far left, the threshold value is set to 0, whereas when it is moved to the far right, the threshold value is set to 100. When the threshold value is set lower, the number of pixels decreasing the saturation is increased, whereas when the threshold value is set higher, the number of pixels increasing the saturation is increased. The user can move the slider bar 706 left by pressing down a button 704, or move the slider bar 706 right by pressing down a button 705.

Buttons 707 and 708 are ones for setting to enable and disable a density adjustment function, respectively. When the button 707 is pressed down, the density adjustment function is enabled, whereas when the button 708 is pressed down, the density adjustment function is disabled.

While the density adjustment function is disabled, the CMYK density values output by the UCR processing component 303 are directly output to the binarization processing component 309 without going through the counters 304 and 306, and storage device 307. On the other hand, while the density adjustment function is enabled, the target reduction rate can be set by moving a slider bar 711 right and left. Moving the slider bar 711 left enables the target reduction rate to be set lower, whereas moving it right enables the target reduction rate to be set higher. Accordingly, if the slider bar 711 is moved to the far left, the target reduction rate is set to 0%, whereas if it is moved to the far right, the target reduction rate is set to 100%. The user can move the slider bar 711 left by pressing down a button 709, or move the slider bar 711 right by pressing down a button 710.

In this embodiment, a screen layout is not limited to the above screen layout, but may be another screen layout providing a user interface capable of the above-described user setting.

As described above, according to the second embodiment, the user can set the threshold value for the saturation adjustment, and the reduction rate of the consumption amount of the recording material. An approach for equally reducing the CMYK density values based on the density adjustment is the same as the conventional approach for reducing the consumption amount of the recording material, and therefore deteriorates both clearness and contrast. However, in the second embodiment, the consumption amount of the recording material is reduced based on the saturation adjustment before the density values are equally reduced, so that contribution of the density adjustment to the reduction in the consumption amount of the recording material can be made smaller, and therefore the deterioration in contrast can be suppressed as compared with the conventional case.

Finally, a third embodiment of the present invention is described with reference to the drawings.

In the second embodiment, it is necessary to spool the image data once in the storage device such as the hard disk or memory of the image processor. In the case of a copying machine required to perform high-speed printing due to a large number of printing documents, the spooling of the image data is not practical. For this reason, the third embodiment is adapted to be able to accommodate a printing system required to perform the high-speed printing.

Figure 4:
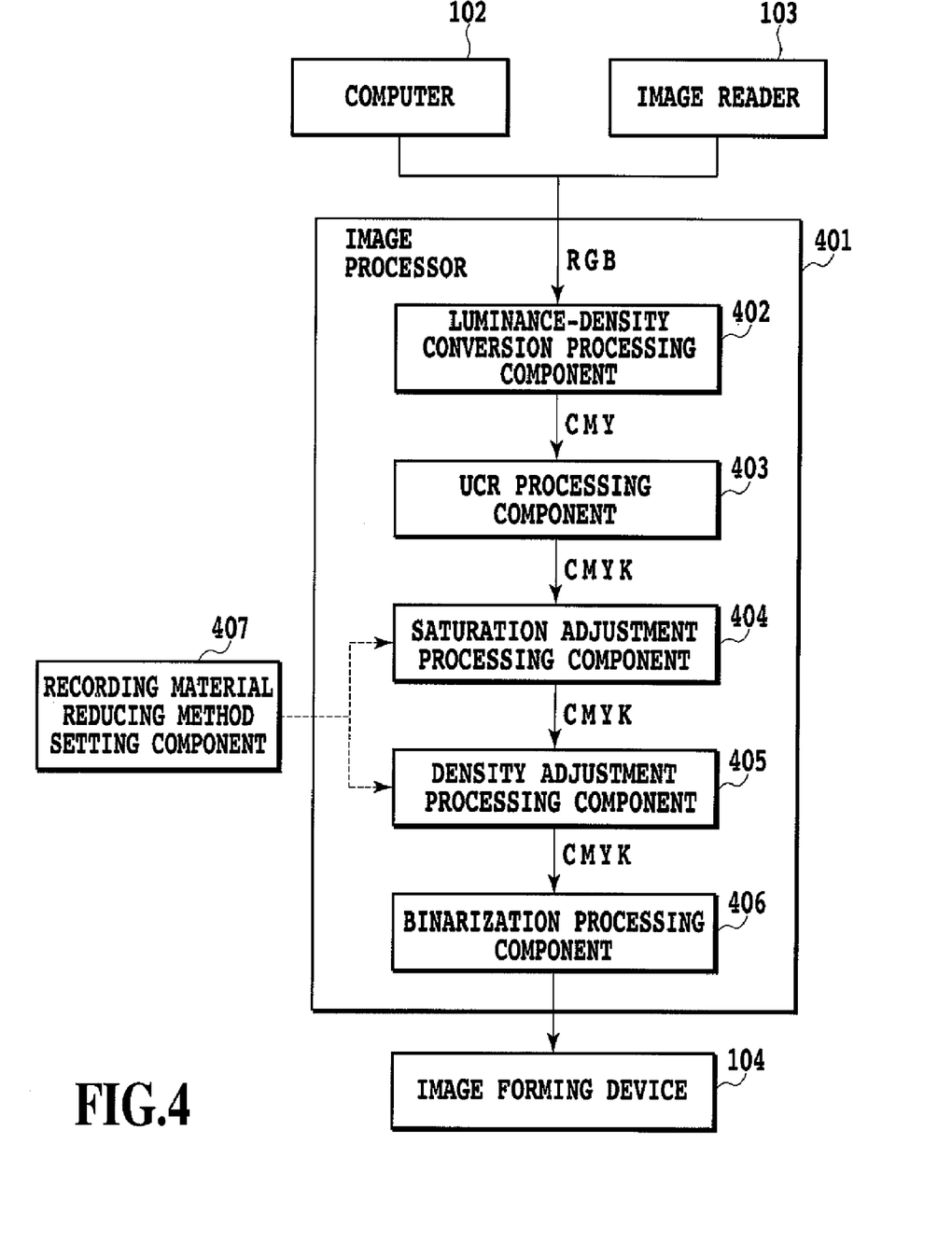
FIG. 4 is a block diagram illustrating an example of an image forming system according to a third embodiment.

FIG. 4 is a block diagram illustrating one example of an image processor in the third embodiment.

Image processing functions in the third embodiment are described below in detail with reference to an image processor 401 illustrated in FIG. 4.

The image processor 401 comprises a luminance-density conversion processing component 402, UCR processing component 403, saturation adjustment processing component 404, density adjustment processing component 405, and binarization processing component 406.

The computer 102 or the image reader 103 outputs a printing command and image data to the image processor 401. The image data is output in the form of RGB luminance signals.

Upon receipt of the RGB signals input from the computer 102 or the image reader 103, the luminance-density conversion processing component 402 converts RGB luminance values into CMY density values with use of logarithmic conversion.

The UCR processing component 403 performs UCR that replaces a density value of an under color, which is the minimum density value among CMY, by a density value of black, and then outputs the UCR-processed CMYK density values to the saturation adjustment processing component 404.

The saturation adjustment processing component 404 reduces the CMYK density values to thereby reduce the consumption amount of the recording material and also increase saturation. In this processing, the reduction rate of the consumption amount of the recording material is calculated on a pixel-by-pixel basis. The other processing associated with the saturation adjustment processing component 404 is the same as the saturation adjustment processing performed in the first embodiment.

The density adjustment processing component 405 calculates on a pixel-by-pixel basis a difference between the reduction rate of the consumption amount of the recording material having been calculated in the saturation adjustment processing component 404 and the target reduction rate of the recording material having been set in a recording material reducing method setting component 407 by the user. The density adjustment processing component 405 equally reduces the CMYK values at the difference in rate with use of the same approach as in the second embodiment. For example, if the target reduction rate of the recording material having been set by the user is 50% whereas the reduction rate of the consumption amount of the recording material having been reduced by the saturation adjustment processing component 404 is 15%, the density adjustment processing component 405 further reduces the CMYK density values at the rate of 35%, which is the difference therebetween. This reduction can be accomplished by equally multiplying the CMYK density values by a gain of 0.65. Alternatively, the CMYK densities may be equally reduced with use of a simple function. This processing for equally reducing the CMYK densities may be any processing capable of calculating the CMYK density values to be reduced. Subsequently, the density adjustment processing component 405 outputs the density-adjusted CMYK to the binarization processing component 406.

The binarization processing component 406 converts the CMYK into a binary or a multi-value image that the image forming device 104 can handle, and then outputs it to the image forming device 104.

As described above, according to the third embodiment, the user can set the threshold value referred to by the saturation adjustment processing component 404 and the target reduction rate of the consumption amount of the recording material referred to by the density adjustment processing component 405. In the second embodiment, the target reduction rate of the consumption amount of the recording material is set for the whole of the image, whereas in the third embodiment, the target reduction rate of the consumption amount of the recording material is set on a pixel-by-pixel basis.

In the first to third embodiments, the threshold value and target reduction rate may be configured to be changed depending on the type of an object of the print data (text object, graphic object, image object). This enables an appropriate recording material reducing method to be used depending on the type of the object. In the case of the text object or the graphic object, visual quality is likely to be improved if the saturation adjustment is performed such that the saturation is dramatically increased. Accordingly, it can also be considered that the target reduction rate of the CMYK densities in the text object or the graphic object is set larger than that in the image object.

The scope of the above embodiments also includes a processing method comprising: storing in a recording medium a program operating the configurations of the above embodiments so as to realize the functions of the above embodiments; reading the program stored in the recording medium as a code; and executing it on a computer. Also, the above embodiments include the above program itself as well as the recording medium storing thereon the above program. As the recording medium, for example, a floppy disk, hard disk, optical disk, magneto-optical disk, CD-ROM, magnetic tape, nonvolatile memory card, or ROM can be used. The scope of the above embodiments also includes not only the above processing method performing the processing solely with the program stored in the recording medium, but also those operating under OS to perform the operations of the above embodiments, in conjunction with other software, and a function of an expansion board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-109693, filed Apr. 18, 2007, which is hereby incorporated by reference herein in its entirety.

What is claimed is:

1. An image processor for outputting image data to an image forming device forming an image on a recording medium with use of a recording material having a plurality of color components, the image processor comprising:
   a determination component for determining a region having higher brightness than a predetermined brightness and a region having lower brightness than the predetermined brightness in the image data on the basis of the image data; and
   a saturation adjustment component for adjusting saturation so as to reduce density values of color components other than a color component having a maximum density value among the plurality of color components of the recording material to increase saturation in a region having brightness determined to be high by the determination component, and reduce density values of color components other than a color component having a minimum density value among the plurality of color components of the recording material to decrease saturation in a region having brightness determined to be low by the determination component.

2. The image processor of claim 1, further comprising a density adjustment component for adjusting density so as to obtain a reduction rate of a consumption amount of the recording material on the basis of the density values reduced by the saturation adjustment component, compare the reduction rate of the consumption amount of the recording material with a predetermined target reduction rate, and if the reduction rate of the consumption amount of the recording material is smaller than the target reduction rate, further reduce the density values reduced by the saturation adjustment component such that the reduction rate of the consumption amount of the recording material is made equal to the target reduction rate.

3. The image processor of claim 2, further comprising a component setting the target reduction rate specified by a user.

4. The image processor of claim 1, wherein the saturation adjustment component compares a density value of an under color of the recording material with a predetermined threshold value, and if the density value is smaller than the threshold value, determines the brightness to be low, or if the density value is larger than the threshold value, determines the brightness to be high.

5. The image processor of claim 4, further comprising a component setting the threshold value specified by a user.

6. The image processor of claim 4, further comprising a configuration in which the threshold value and the target reduction rate are changed depending on the type of an object of print data.

7. An image processing method for outputting image data to an image forming device forming an image on a recording medium with use of a recording material having a plurality of color components, the image processing method comprising the steps of:
- determining a region having higher brightness than a predetermined brightness and a region having a lower brightness than the predetermined brightness in the image data on the basis of the image data; and
- reducing density values of color components other than a color component having a maximum density value among the plurality of color components of the recording material to increase saturation in a region having brightness determined to be high, and reducing density values of color components other than a color component having a minimum density value among the plurality of color components of the recording material to decrease saturation in a region having brightness determined to be low.

8. The image processing method of claim 7, further comprising the step of obtaining a reduction rate of a consumption amount of the recording material on the basis of the reduced density values, comparing the reduction rate of the consumption amount of the recording material with a predetermined target reduction rate, and if the reduction rate of the consumption amount of the recording material is smaller than the target reduction rate, further reducing the reduced density values such that the reduction rate of the consumption amount of the recording material is made equal to the target reduction rate.

9. The image processing method of claim 7, further comprising the step of comparing a density value of an under color of the recording material with a predetermined threshold value, and if the density value is smaller than the threshold value, determining the brightness to be low, or if the density value is larger than the threshold value, determining the brightness to be high.

10. A non-transitory computer-readable recording medium having computer-executable instructions for performing outputting image data to an image forming device forming an image on a recording medium with use of a recording material having a plurality of color components, the computer-executable instructions comprising steps of:
- determining a region having higher brightness than a predetermined brightness and a region having lower brightness than the predetermined brightness in the image data on the basis of the image data; and
- adjusting saturation so as to reduce density values of color components other than a color component having a maximum density value among the plurality of color components of the recording material to increase saturation in a region having brightness determined to be high by the determining step, and reduce density values of color components other than a color component having a minimum density value among the plurality of color components of the recording material to decrease saturation in a region having brightness determined to be low by the determining step.

* * * * *